(12) United States Patent
Rasmussen

(10) Patent No.: US 6,539,835 B1
(45) Date of Patent: Apr. 1, 2003

(54) I-YOKE MECHANISM

(76) Inventor: Gunnar Vestergaard Rasmussen, Vængemosevej 13, Skaarup DK-5881 (DK)

( * ) Notice: Subject to any disclaimer, the term of this patent is extended or adjusted under 35 U.S.C. 154(b) by 0 days.

(21) Appl. No.: 09/743,415
(22) PCT Filed: Jun. 4, 1999
(86) PCT No.: PCT/DK99/00297
§ 371 (c)(1), (2), (4) Date: Jan. 10, 2001
(87) PCT Pub. No.: WO00/03122
PCT Pub. Date: Jan. 30, 2000

(30) Foreign Application Priority Data

Jun. 4, 1998 (DK) .......................... 1998 00722

(51) Int. Cl.⁷ .............................. F01B 9/00; F16H 21/18
(52) U.S. Cl. ............................................. 92/140; 74/50
(58) Field of Search ................................. 92/140; 74/50

(56) References Cited

U.S. PATENT DOCUMENTS

| 4,559,838 A | 12/1985 | Neuenschwander |
| 4,598,672 A | 7/1986 | Jayne et al. |

FOREIGN PATENT DOCUMENTS

| DE | 409919 | 2/1925 |
| DE | 3 433 510 | 3/1986 |
| SU | 1116 198 | 9/1984 |
| SU | 1151 703 | 4/1985 |
| SU | 1281 700 | 1/1987 |

*Primary Examiner*—Edward K. Look
*Assistant Examiner*—Michael Leslie
(74) *Attorney, Agent, or Firm*—James Creighton Wray; Meera P. Narasimhan

(57) ABSTRACT

A piston machine with at least one axially movable piston in a cylinder is designed with a force conversion mechanism implying sinusoidal piston movement by rotation of the power input or power output shaft of the machine, depending on its application. As the pistons of the machine are fastened perpendicularly to a crosshead yoke (5) at their preferably light, cylindrical piston-rods (2,2'), in which two crosshead slides (14,14') each are provided on a crank pin journal (7,7'; 8,8') which is synchronized to perform rotation with mutual opposite directions of rotation (indicated as arrows). This arrangement causes the crosshead slides longitudinally in the yoke to move in exact mutual opposition and to reverse their direction of movement at the exact same time. Thus, the lateral pressure on pistons is completely eliminated and without any addition of any extra balancing mechanism there may be achieved a complete outbalancing of the reciprocating and rotating masses in the machine.

18 Claims, 11 Drawing Sheets

Figure 1:
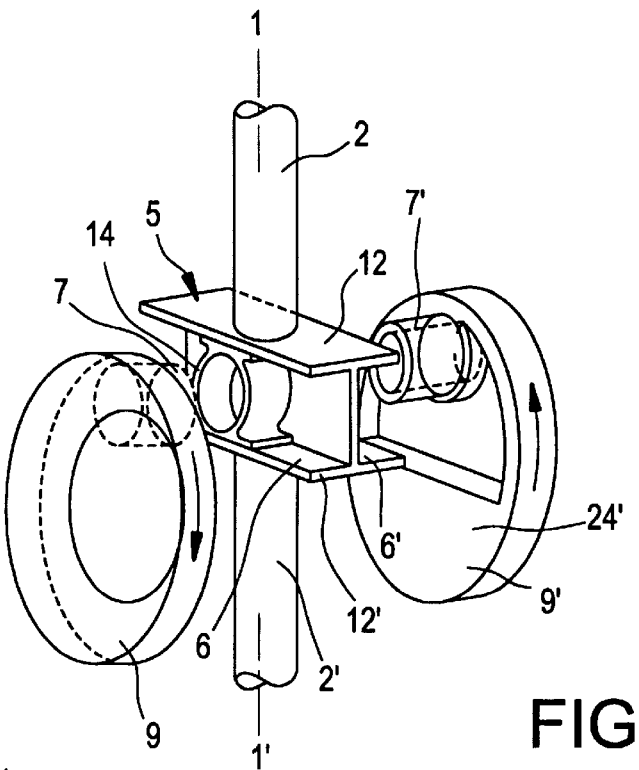

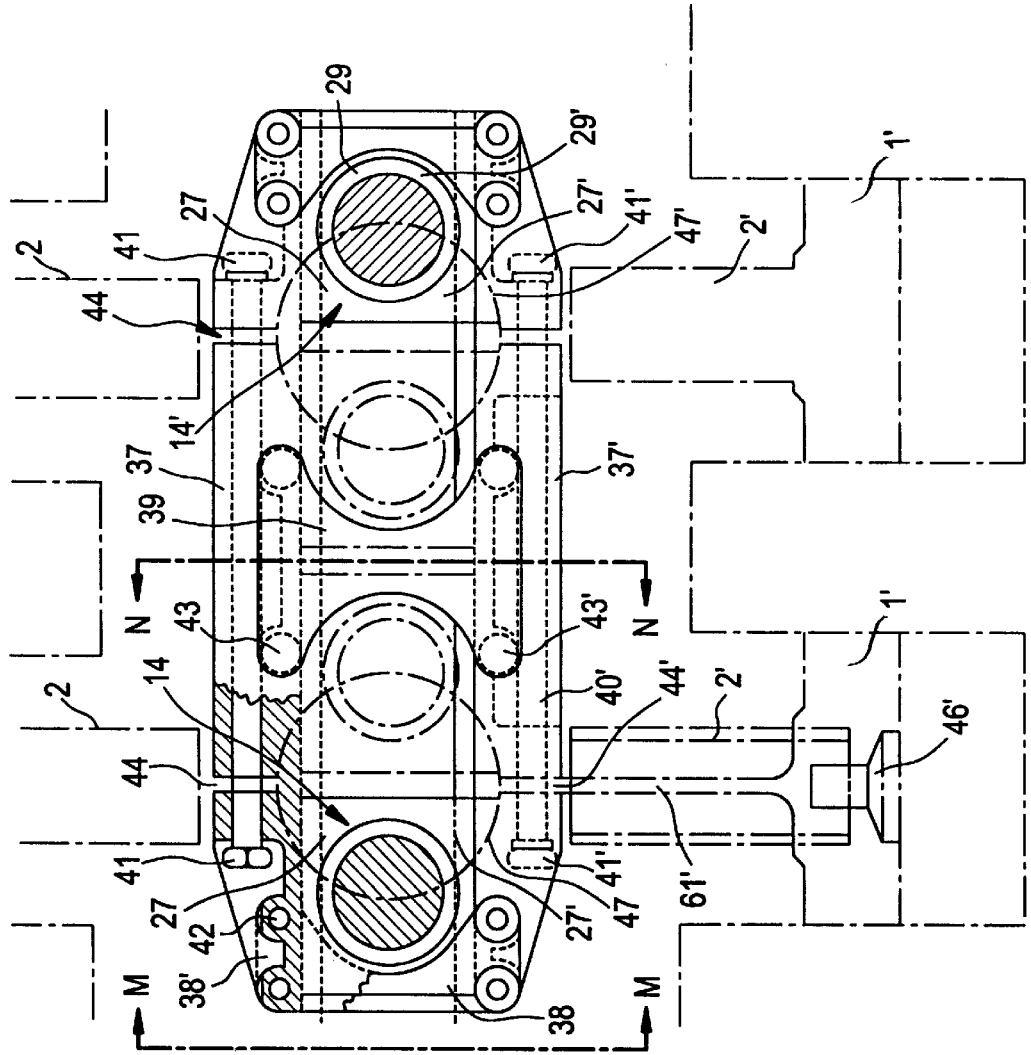
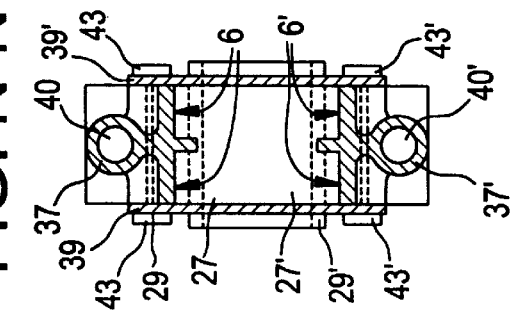
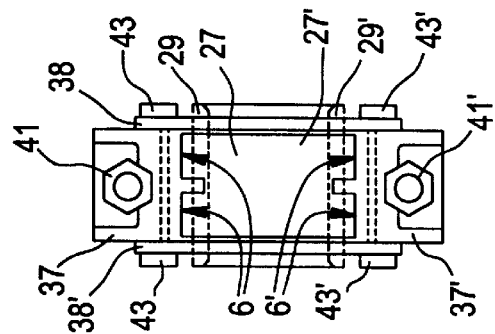

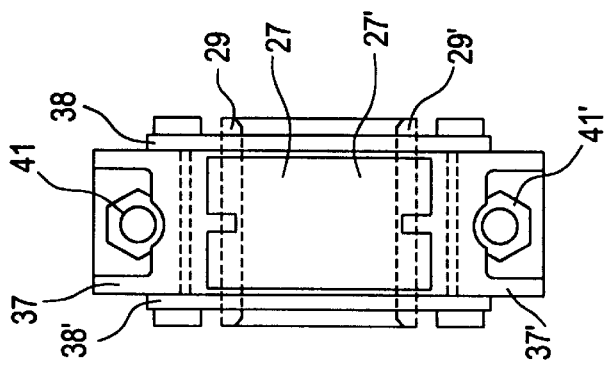
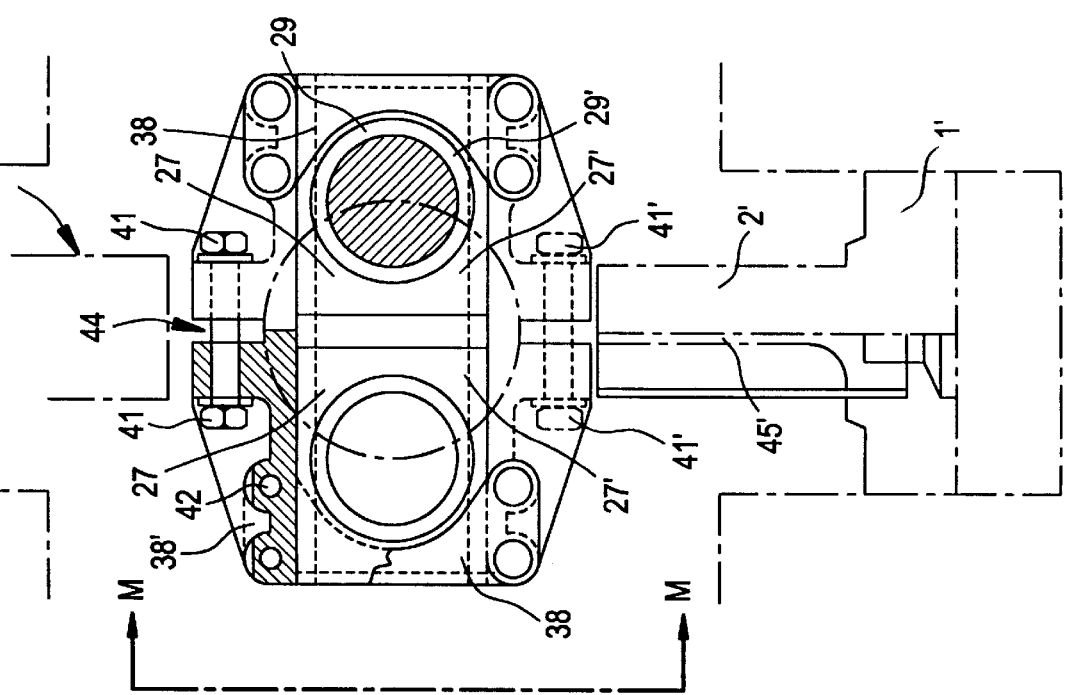
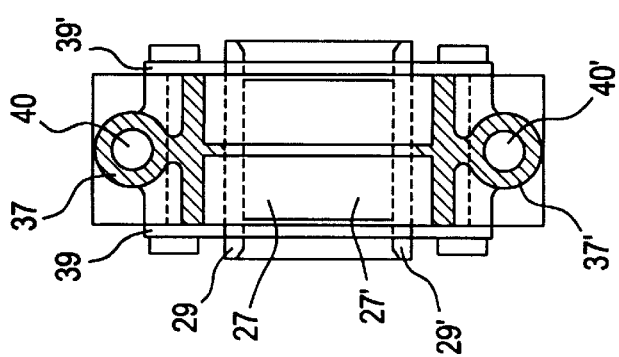

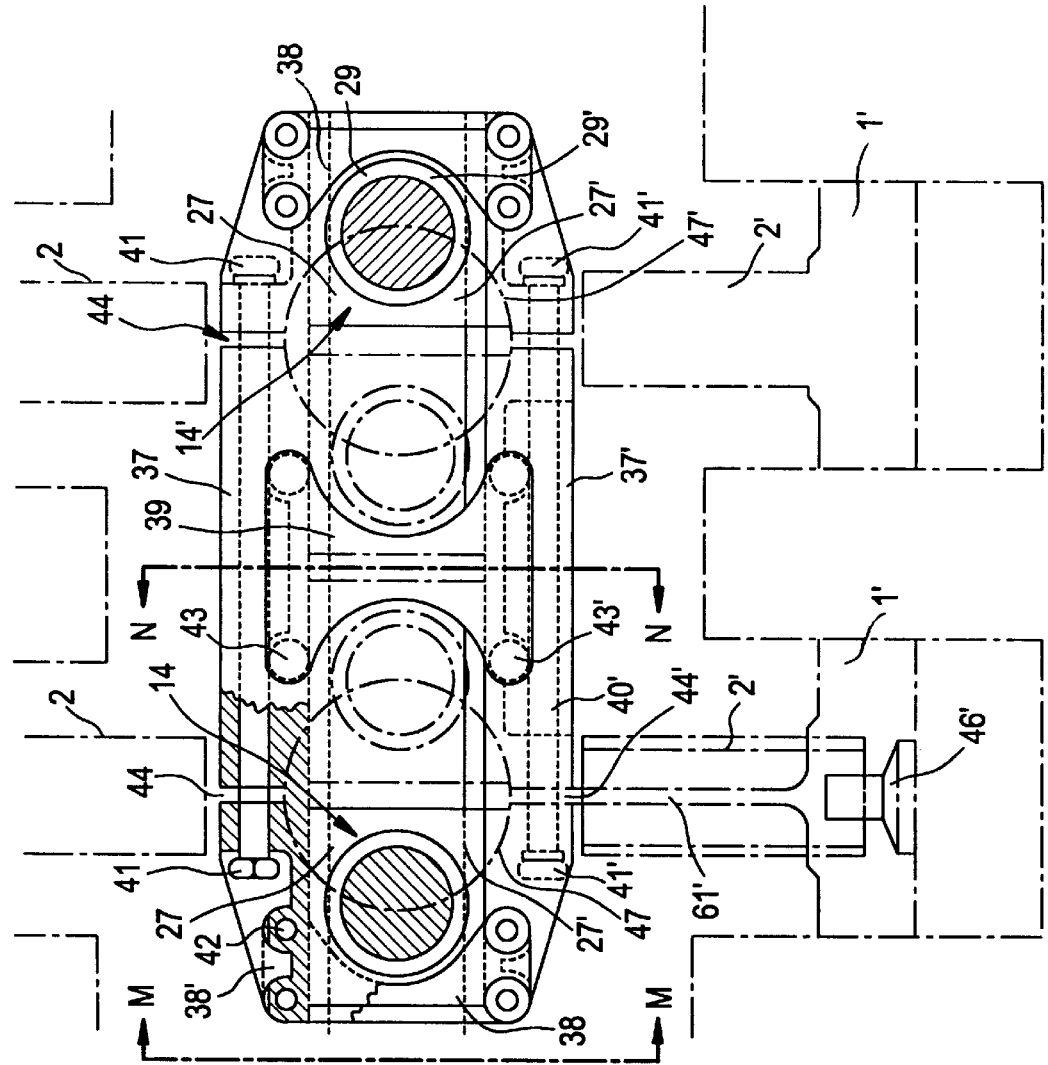

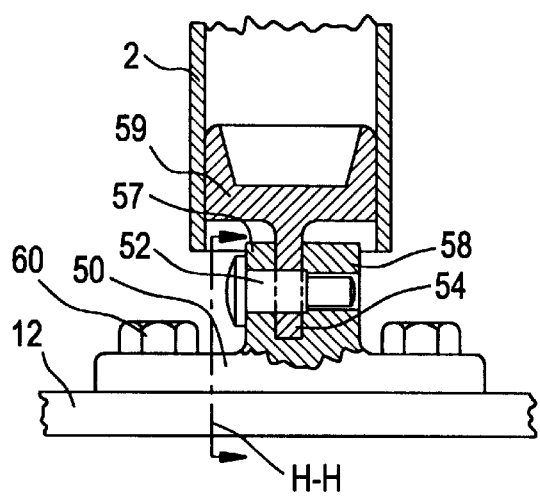
FIG. 16
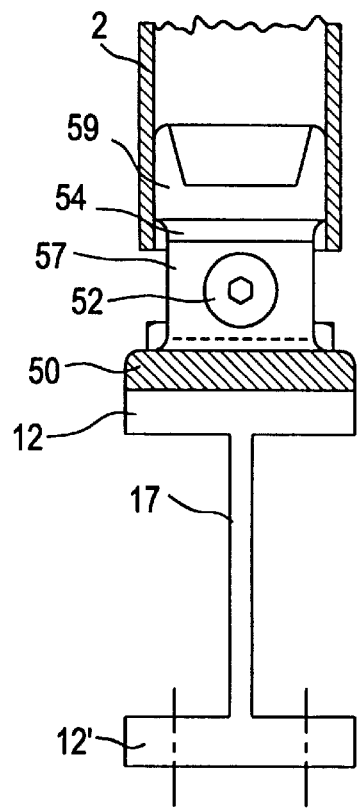
FIG. H-H
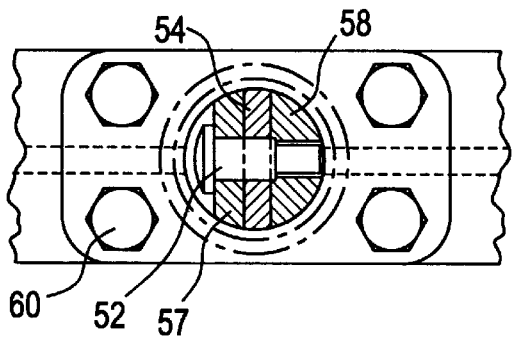
FIG. 17
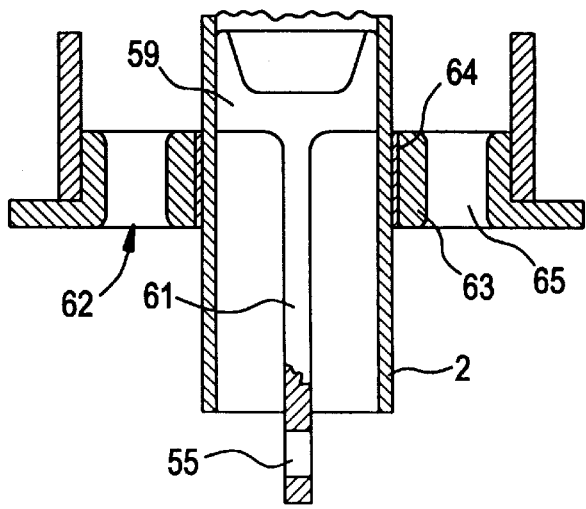
FIG. 18

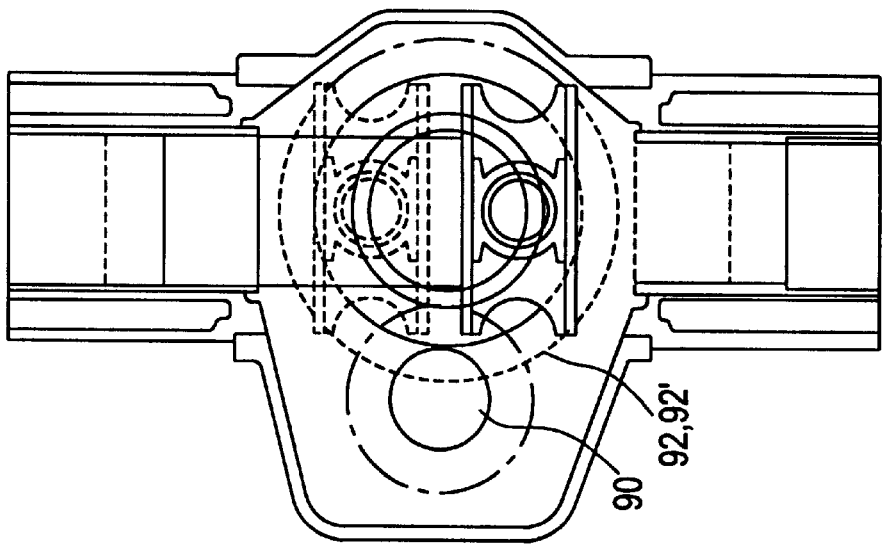
FIG. 23
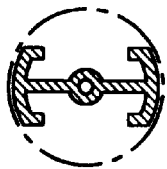
SNIT A-A
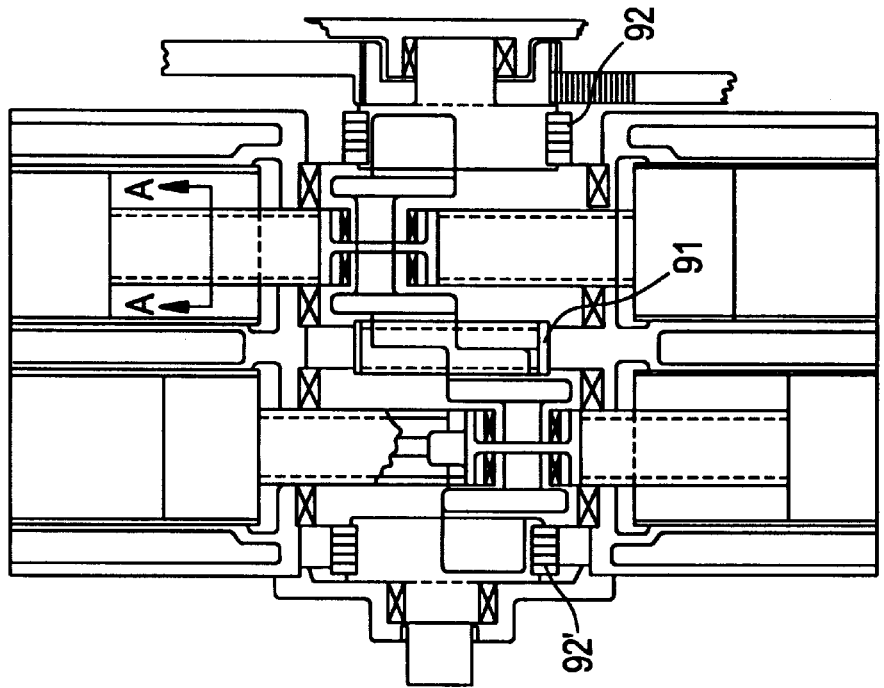

I-YOKE MECHANISM

BACKGROUND OF THE INVENTION

The present invention concerns a force and movement conversion mechanism which in piston machines with at least one piston is used for transmitting forces between the reciprocating piston/pistons in the machine and its rotating power input or power output shaft depending on the application of the machine.

More precisely the invention concerns a piston machine comprising at least one axially movable piston in a cylinder, the piston being connected to a rotating power input or power output shaft through a preferably hollow and cylindrical piston-rod which is connected to a crosshead yoke disposed perpendicularly to the piston-rod axis, in which crosshead yoke two crosshead slides are disposed on each their crank pin journal and fitted in between sliding surfaces formed in the crosshead yoke, where they synchronized are forced to perform sliding along the yoke in mutual perfect opposition, as the two crank pin discs or double cranks interacting via yoke are forced to rotate with identical rpm in mutual opposite direction of rotation and adjusted in such a way that the two crosshead slides on exact same time are situated in the positions in the yoke, where the piston is in its top or bottom dead point.

The mechanism may be used in piston machines with either crank pin or crank mechanisms, like the hitherto known "Scottish Yoke Mechanism", it uses a crosshead yoke disposed perpendicularly to the central axis of the piston, but deviates from "Scottish Yoke Mechanism" by using two, instead of one, crosshead slides placed on crank pin journals performing their sliding movements longitudinally of the crosshead yoke in mutual opposite direction with decelerations and accelerations which at any time are identical for both crosshead slides, and as they reverse their sliding direction on the exact same time, which is achieved by using a synchronizing mechanism suitable for this ensuring that the utilized crank pin discs or crank shafts, two for one crosshead yoke, the journals of which are suspended in the bearing bushing of their individual crosshead slides, are rotated with the same rpm about their central axes extending perpendicularly to the longitudinal direction of the yoke, but in mutual opposite direction of rotation, as the synchronization, besides that, is adjusted in such a way that the two crosshead slides on the exact same time are situated exactly in the position in the crosshead yoke causing the piston to stand in its top dead point position or bottom dead point position.

A piston machine as disclosed by way of introduction is known from SU-A-1,281,700. This document discloses a piston engine with a piston rod connected to a single crosshead yoke, the yoke is connected to two crank shafts rotating at the same rpm in opposite directions. The connection to the yoke is provided by crosshead slides fastened to the yoke so that the crank shafts and the piston reach top and bottom dead center at exactly the same time, in synchronism.

Thus the piston machine discloses a construction with two parallel crank shafts being connected to a single piston through the yoke mechanism. Each crosshead slide is provided as a glide bushing and a further bearing bushing which is arranged perpendicularly is used for the connection to the crank shaft journal. This construction is rather complicated and associated with drawbacks as the centre line of the crosshead slides should be displaced in relation to the centre line passing through the central lines of the two co-operating crank shafts when these is provided in same distance at each side of the piston axes. This construction makes it necessary to have a rather large height of the machine and moreover, the length of different piston rods would be different from each other. Moreover, the construction with one or two set of pistons arranged in the central part of the yoke is inconvenient as the yoke hereby is subjected to bending in the longitudinal direction.

SUMMARY OF THE INVENTION

It is the object of the present invention to disclose a piston machine which do not suffer from the drawbacks associated with prior art piston machines and which may be used in connection with a power input or a power output shaft depending on the application of the machine, which machine simultaneously is able to work with a yoke mechanism embodied as an I-yoke or a beam yoke and which piston machine could have the power input or power output shaft provided in the form of a crankshaft or the shaft for a crank pin disc.

According to the present invention this object is obtained with a piston machine mentioned by way of introduction and being characterised in that the yoke is provided with top and bottom flanges, which at their mutually facing side surfaces form longitudinal sliding surfaces, or are basis of fastening of longitudinal sliding surfaces fastened thereon, wherebetween the two crosshead slides at each side of the web part of the yoke in mutual opposition perform their sliding movements along the yoke, as they at the middle of this pass each other and perform outward strokes, which for both slides at the exact same time is finished by their turning of their direction of sliding equidistantly from the middle of the yoke, where pistons at their piston-rods are fastened on the outward facing side surface of the top flange and/or bottom flange of the yoke, and that the pistons thereby are arranged directly over the associated power input or power output shaft.

With the movement of the crosshead slides it is possible to have the piston axes arranged directly over the shaft used for power input or power output when the pistons are arranged in their top and bottom dead center. Hereby no bending action will occur in the yoke. Simultaneously, the yoke construction may be embodied as a technically simple product as the sliding surfaces maybe provided by web parts of a beam which may have different embodiments.

The invention is thus suitably effected by using in principle two different shapes of crosshead yokes, of which one is particularly suitable for using together with crank pin discs, it has a mainly I-shaped cross-section why the yoke subsequently is designated "I-yoke", while the mechanism of which it forms a part is designated "I-yoke mechanism", the other crosshead yoke is especially suitable for use together with crank-shafts, it is built up by interaction between two so-called sliding surface beams, why the yoke subsequently is designated "beam yoke", while the mechanism of which it forms a part is designated "beam yoke mechanism".

As the pistons reach their top or bottom dead points simultaneously, then their sliding in each their direction perform decelerations which at every time are identical for both crosshead slides and is continued until they after 90 degrees of rotation of the crank pin discs or cranks on the exact same time turn the direction of movement of their sliding stroke and herefrom quite uniformly are accelerated up to their greatest sliding speed, which is achieved just at the passage of their position in the yoke at the subsequent piston turning at its top or bottom dead point Accordingly, the impacts on the yoke are minimized.

The invention will be further explained in connection with the enclosed drawing.

The fundamental construction of the I-yoke mechanism appears on FIG. 1. The crosshead yoke (5) is an I-yoke made e.g. by sintering a light and strong alloy and formed in one with a not shown piston bolt fitting (48,48' FIGS. 14 and 15) on which the piston-rods (2,2') with their respective pistons are fastened.

At each side of the central web part (17) of the I-yoke, on the sliding surfaces (6,6') between the top and bottom flanges of the I-yoke, there is inserted crosshead slides (14,14'), of which only one (14) can be seen. The rectangular sliding surfaces are intended to be coated with a smooth and wear-resistant material, e.g. amorphous diamond, besides that the crosshead slides are made with lubricating ducts extended to both the bushings and the sliding surfaces of the crossheads.

DETAILED DESCRIPTION

On the draft FIG. 1, the crank pin discs (9,9'), for the sake of clarity, are drawn out from each side of the I-yoke so that it may be shown that the crank pins (7,7') project from their respective crank pin discs, where, with the crank pin discs placed in their operating position, they lie quite closely to, though without touching the edges on, the top and bottom flanges (12 and 12') of the yoke.

During operation, the crank pins (7,7') are each placed in the bearing bushings of their respective crosshead slides (14,14'), in which they are rotated by the rotation of the crank pin discs (9,9') about their common axis line in FIG. 1, but in each their direction which in FIG. 1 is marked with the arrows shown on the outer courses of the crank pin discs. This rotation in mutually opposite direction is ensured, as it is illustrated later, by using a synchronizing mechanism which besides by its adjustment also provides that the crank pins (7,7') during their turning in their equally large stroke circles have their centre lines placed exactly opposite each other on the times where the piston (1,1') situated on the piston-rod (2,2') reverses at its top or bottom dead point.

Figure 2:
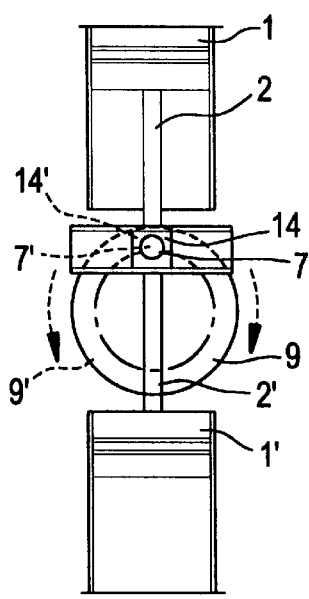
Figure 3:
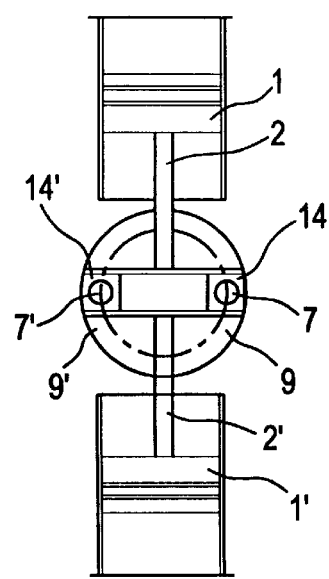
Figure 4:
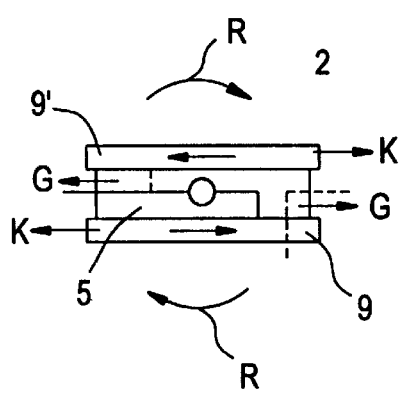

By effecting the above described movement it is achieved, as it appear from FIG. 1 supported by the drafts FIGS. 2, 3 and 4, to result in:

A sinusoidal (harmonic) piston movement, as the pistons (1,1') as shown in FIG. 2 are in their respective top and bottom dead points when the crosshead slides (7,7') stands exactly in top of their stroke circle and have performed exactly half of their piston stroke on the time where the crosshead slides (7,7') by 90 degrees rotation of the crank pin discs (9,9') are situated farthest from each other in the yoke, which leads to the result that the pistons (1,1'), under the condition of even rotation of the crank pin discs (9,9'), perform the remaining half of their piston stroke with precisely the same time consumption as at the first half, whereby their reciprocating become quite harmonic and therefore may be outbalanced 100% with balance weights (24,24' FIG. 1).

Figure 5:
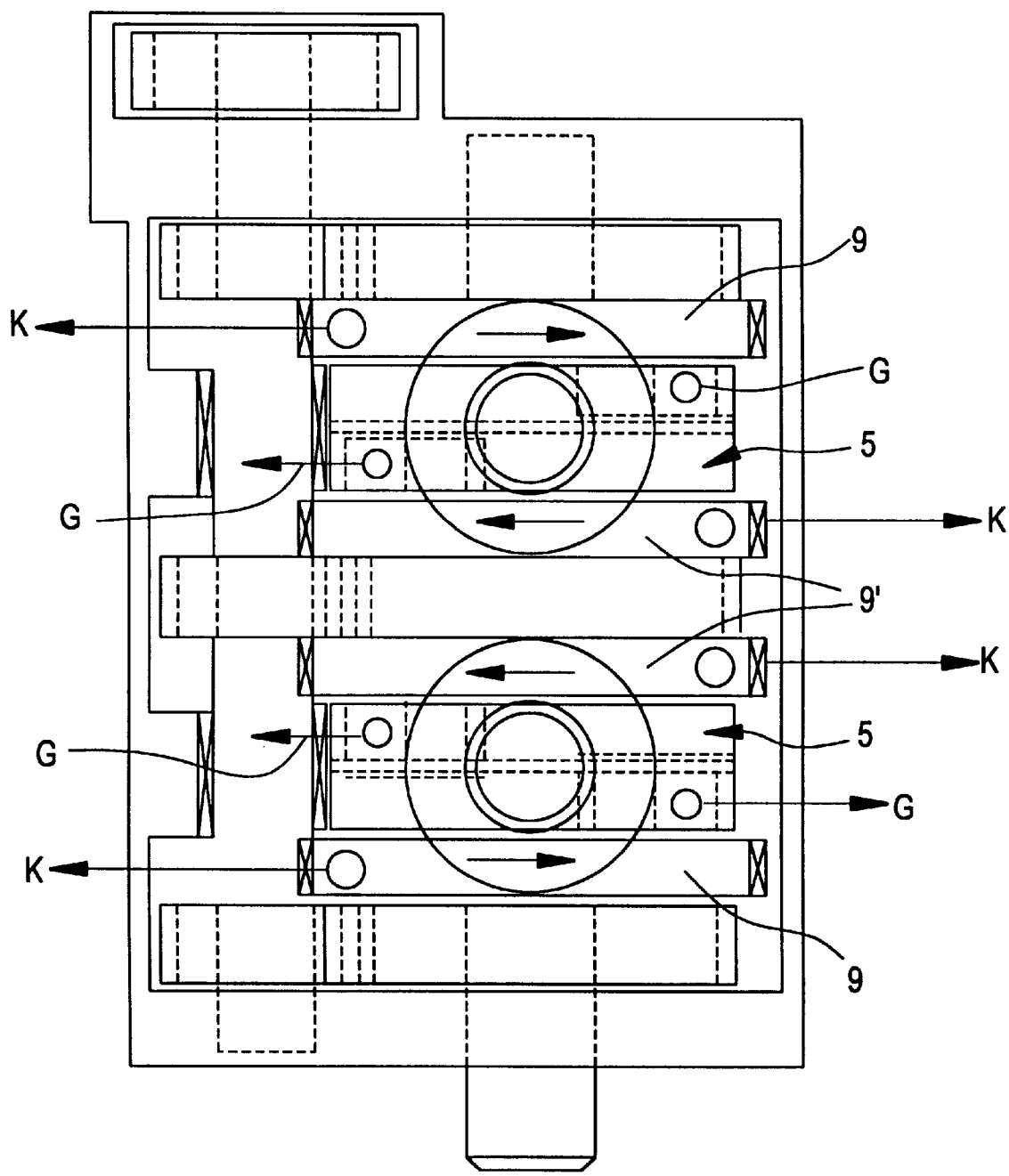

A guiding of the crosshead slides (14,14'), making them perform their sliding along the I-yoke (5) in exact mutual opposition which in connection with their being situated closely to its relatively thin, central web part (17) implies that the reaction from piston-rod whipping known from machines using crank and connecting rod is counteracted. In machines only using one I-yoke (5), as a consequence of inertial forces from balance weights (24,24') marked K and from crosshead slides (7,7') marked G, a small torque shown with the mark R in FIG. 4 will arise. The presence of the torque is eliminated completely in machines which, as shown in FIG. 5, use two I-yokes (5), where by it appears that inertial forces are outbalanced internally in the machine and therefore do not result in any force acting outside this, which in connection with the rotating masses with opposite direction of rotation in the machine being evenly distributed and therefore neutralised result in that machines of this kind are completely outbalanced by themselves.

A complete exemption from lateral pressure on the piston because the crosshead slides (14,14') evenly absorb the forces acting in the piston axis, and, except for their position in the top and bottom dead points of the piston (1,1') where they are situated centrally under the basis of fastening on the I-yoke (5) of the piston-rod, otherwise have moved outward along the yoke to each their side herefrom and continually have the same mutual distance herefrom, as they at any time have the centres of their crosshead slides situated in axes standing perpendicularly on the piston axis along the yoke (5) and hereby ensure that that no turning of the yoke (5) from this axis takes place.

The draft FIG. 2 shows schematically a piston machine like the one shown in FIG. 1 and like this with the pistons (1,1') shown in same position, namely in the top and bottom dead point, respectively, where the optimum compression pressure and inertial forces appear. Therefore, it is suitable that the crosshead slides (14,14') just then are situated on the middle of the I-yoke (5) which therefore neither is subjected to bending nor twisting. At the same time it is advantageous that the crosshead slides (14,14') just then achieve their greatest sliding speed and hydrodynamic carrying capacity.

The draft FIG. 3 shows correspondingly the situation for the mechanism when the pistons (1,1'), after having left their position shown in FIG. 1, have moved halfway down through their piston stroke and the crosshead slides (14,14') during the piston movement along the I-yoke (5) have moved with same decreasing speed at any time in each their direction along the yoke and in the middle of the piston stroke have stopped their movement with standstill farthest out in the yoke where they reverse their direction of movement.

At the time of reversing of the crosshead slides, the piston (1) has achieved its greatest speed in the piston stroke, and force transmitted from the piston to the two interacting crosshead slides (14,14') is a driving pressure reduced as compared with the initial driving pressure and which in four-stroke engines with two pistons disposed in the same piston axis is counteracted by the compression or exhaust pressure on the piston opposite to the driven piston (1').

The reduced action of force at the time where the crosshead slides (14,14') reverse in their outer positions combined with they evenly share this results in the load on the crosshead slides (14,14') being less than that they are subjected to in their position at the reversing of the piston (1,1') over its top or bottom dead point, which is advantageous because the momentarily interrupted hydrodynamic pressure build-up in the oil film between the crosshead slides (14,14') and the sliding surfaces (6,6') of the I-yoke implies the risk of the oil film being reduced by pressing out too much oil caused by great pressure load as well as it being suitable for reducing the risk of bending and twisting of the I-yoke (5).

The torsional action on the I-yoke (5) can be counteracted to a certain extent by elongating the rectangular siding surfaces of the crosshead slides. Greater torsional stiffness may be achieved simultaneously with greater bending stiffness by forming reinforcing ribs at its outward facing side of its top and bottom flanges (12,12'), the ribs being adapted for placing fastening fittings, e.g. a fastening fitting with locking projections (36,36' FIG. 12), as the projecting ribs have been provided with longitudinal grooves with locking grooves (35,35') which after insertion of the fastening fitting hold this in correct position and because of the engagement between the locking projections (36,36') and the locking grooves (35,35') are prevented from being deformed by lateral bending.

Figure 12:
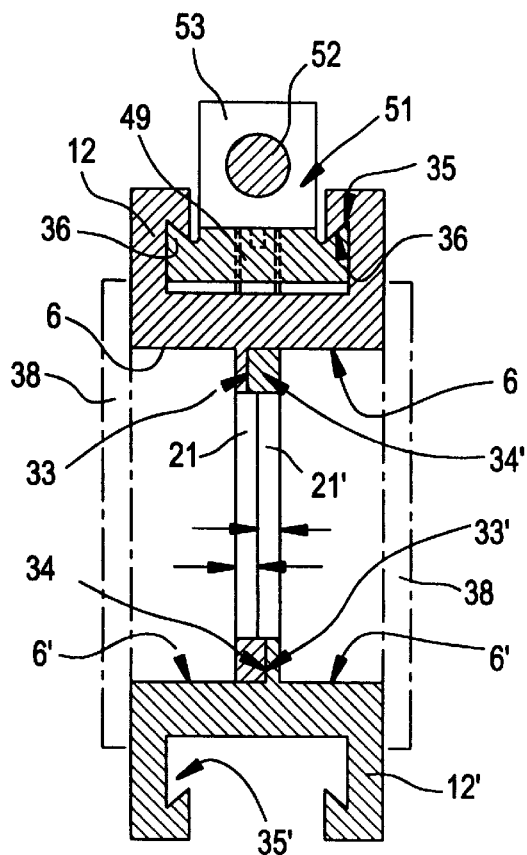

The I-yoke (5) shown in FIG. 12 can be further strengthened for counteracting twisting and bending as well as deformation of its sliding surfaces (6,6') by designing the reinforcing ribs in such a way that they may be used for fastening distance end plates (38,38' FIGS. 12 and 13) with tight-fitting screws.

Besides, the I-yoke in FIG. 12 is assembled from two identical, mainly T-shaped section members (20,20' in FIGS. 6 and 8) which both extend in the full length of the crosshead yoke and are joined together by the web part (21) of the first section being laid against the web part (21') of the second section with the top flange (22) of the first section facing upward and the top flange (22') of the second section facing downward, respectively, as the web parts of the two sections are provided with a longitudinal engaging groove (33,33') and a engaging projection (34,34') interacting with this groove, respectively, enhancing the longitudinal rigidity of the joined section after the clamping together of the two T-shaped sections with tight-fitting bolts (23 in FIG. 8) suited for this and constituting the central web part (17 in FIG. 1) in an I-yoke (5) which is made symmetrical about its longitudinal central vertical plane by the two top flanges (22,22') of the T-shaped sections being given a projection at one side of their web part which is the thickness of their web part (T) longer than that on the opposite side of the web part and hereby form sliding surfaces (6,6'), or is basis of fastening of sliding surfaces (6,6') provided thereon, being of identical width at each side of the central web part of the I-yoke.

A definitive countering of torsional actions on an I-yoke (5) is quite simply to prevent that a torsional action arises which may be achieved by displacing the centre axes of the crank pin discs in parallel laterally equidistantly from the piston axis in the plane in which they also before the displacing in parallel were situated with their axes disposed in extension of each other in a common axis extending perpendicularly through the piston axis in exactly the point where the longitudinal centre axis of the yoke intersects the piston axis when the piston (1,1') is situated in the middle of its piston stroke, as the displacement in parallel is performed to an extent allowing the crosshead slides (14,14') interacting in the yoke (5) to perform their longitudinal sliding movements in mutual opposition centrally in the yoke without overlapping and colliding.

Figure 8:
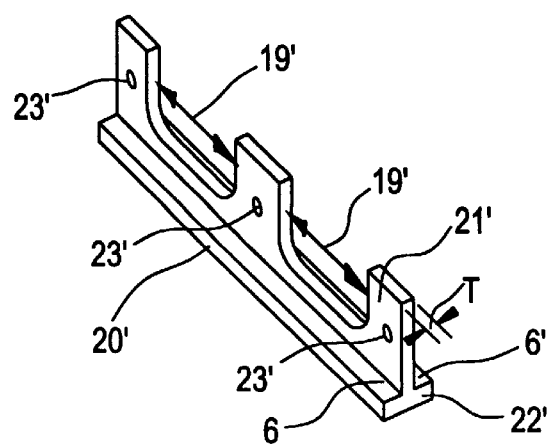
Figure 9:
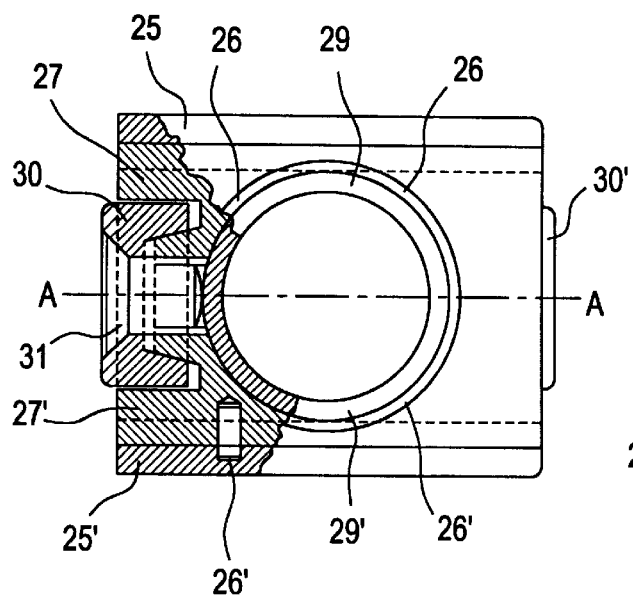
Figure 10:
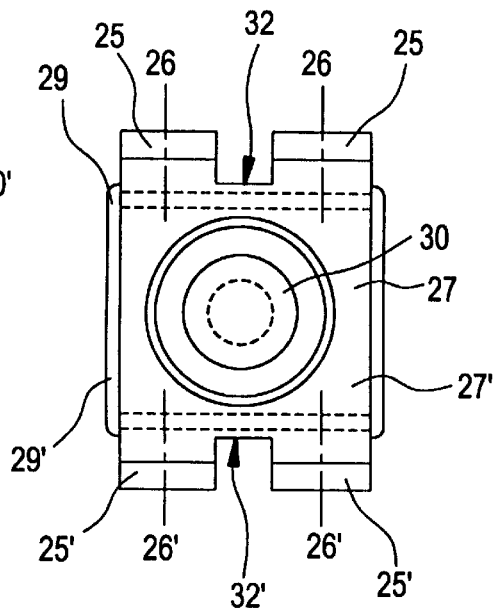
Figure 11:
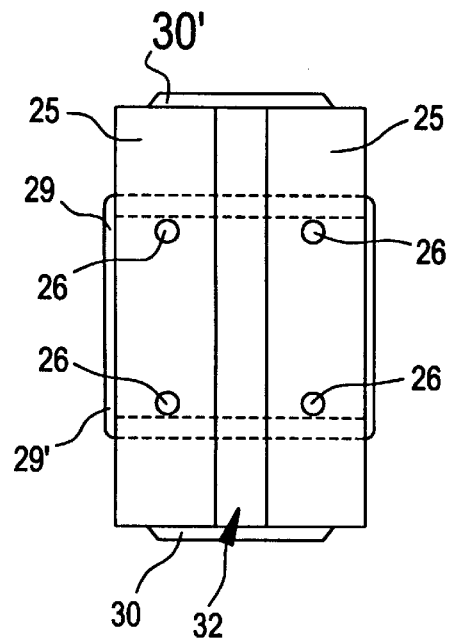

The displacement in parallel makes possible that the crank pins (7,7') may be given so far a projection away from their crank pins (9,9') that they can carry the crosshead slides (14,14') formed by joining the two symmetrical crosshead slide halves (27,27' FIGS. 9, 10 and 11) which have been given a width corresponding to the width of the top flanges (22,22') on the two T-shaped sections (20,20' FIGS. 6 and 8) forming an I-yoke (5), as the T-sections (20,20') are provided with two longitudinal cut-outs (19,19') in the web parts of the T-sections having a length and a height of a magnitude making them capable, after joining, of accommodating and forming sliding surfaces (6,6') for crosshead slides (14,14') of the kind shown in FIGS. 9, 10, and 11, which for being able to operate in the cut-outs of the I-yoke have been designed with longitudinal guide and clearance grooves (32,32') in their rectangular sliding surfaces (25,25') and are guided on the part of the web parts of the T-shaped sections remaining after cutting out, the remaining part projecting as guide rails in the middle of the I-yoke formed after their clamping together.

Since the two I-yokes formed of two T-shaped section becomes considerably weakened by the effected cut-outs, it can be suitable to utilize a crosshead yoke (5) consisting of two sliding surface beams (37,37' FIG. 13 incl. N—N and M—M) having sliding surfaces (6,6') with longitudinal guide rails for crosshead slides of the kind shown in FIGS. 9, 10, and 11 formed on the middle of these, which in mutual opposition perform their sliding movements between the sliding surfaces on the two sliding surface beams being held in exact and correct mutual distance by distance end plates (38,38') and distance intermediate plates (39,39') which are fastened with tight-fitting bolts or tight-fitting screws (43, 43') at each side of the sliding surface beams (37,37') designed with a crosswise rib formation having holes (42, 42') for the tight-fitting bolts or tight-fitting screws which are used for fastening distance end and distance intermediate plates.

The sliding surface beams (37,37') are further reinforced by, as shown in the sectional draft FIG. N—N, being imparted longitudinal and circular rib formations which in their centres are formed with a through-going fit-hole intended for accommodating a longitudinal stiff tight-fitting bolt (40,40') having the purpose of functioning as a reinforcing element and besides that also by its length extends for far out on the central reinforcing part of the sliding surface, that the bolt pass through crosswise slots (44,44') formed as basis of fastening for receiving a rectangular fastening pin projecting from a piston-rod end with a fit-hole formed for the basis of fastening and the through-going tight-fitting bolt through which the tight-fitting bolt is passed for finally clamping together the slots by the nuts (41,41') of which there is formed two per sliding surface beam, which indicates that "the beam yoke" can accommodate four piston sets. Which is illustrated in FIG. 13 by stippled drafting.

The ability to carry two piston sets at each side of a crosshead yoke, either shaped as an I-yoke or "beam yoke", do not only depend on the stiffness of the yoke but to a large extent also of the carrying capacity of the crosshead slides which mainly is determined by the size and the shape of its sliding surfaces, which is one of the reasons for the described yokes using crosshead slides in the embodiment of FIGS. 9, 10 and 11 and which slide on both of the longitudinal and rectangular sliding surfaces joined in the crosshead yoke are advantageous, furthermore they neutralize the twisting action on the yoke by having their sliding surfaces operating at each side of the longitudinal centre axis. Besides, the mentioned crosshead slides are advantageous by having relatively long bearing bushings implying that the bushings do not loose too much of their carrying capacity because of lubricating duct formations which are to secure delivery of lubricating oil from the bearing bushing to the sliding surfaces of the crosshead yoke.

Figure 7:
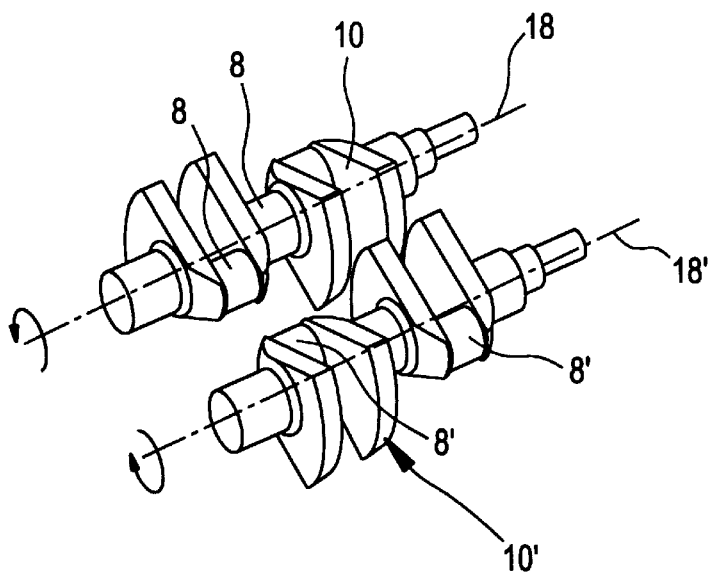

Both I-yoke with two longitudinal cut-outs and "beam yoke" with two longitudinal apertures may instead of using crank pin discs rotated about axes laid in parallel use crankshafts that also are rotated about axes laid in parallel, which is illustrated by the crankshafts shown in FIG. 7 which as shown have their axes situated in parallel in a plane lying in the longitudinal centre axis of the crosshead yoke when the piston is situated in the middle of its piston stroke and in this plane have got theirs axes displaced in parallel with the distance B outward to each side of the axis (the Z-axis) which in the middle of the yoke extends perpendicularly to the longitudinal axis and the piston axis and after the displacing in parallel lies with the two parallel crank axes at a distance A from each other.

Figure 6:
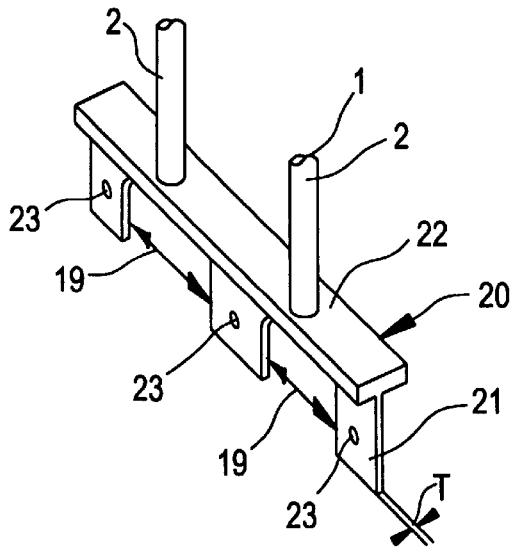

The crankshafts are shown without crosshead slides in FIG. 7 but by means of the drawn co-ordinate axes in FIGS. 6, 7, and 8 there is illustrated how the two T-shaped sections (FIGS. 6 and 8) are put down over the two crosshead slides which are intended to be disposed on the two crank pin journals which in the Z-axis lie closest to the Z marking. "Beam yoke" is disposed in a corresponding way.

From the drafts FIGS. 6, 7, and 8 it appears that the two shown, very short, simple and torsionally stable crankshafts can accommodate two crosshead yokes, which makes possible fastening of even 8 piston sets placed in a very compact piston machine. By using two crankshafts with one crank each and only one yoke, there may be built a very compact 4-cylinder two-stroke or four-stroke engine which without any other arrangement is 100% balanced out for all inertial forces and torques appearing in the machines.

The draft FIG. 15 shows a "beam yoke" made completely as the one shown in FIG. 13 except that the sliding surfaces formed in the yoke on the sliding surface beams are made completely plane. This change causes that the shown "beam yoke" is only suitable for use in machines where there is used two interacting crankshafts, as opposed to I-yoke formed of two T-shaped sections and the "beam yoke" shown in FIG. 13, which both can be used for both two interacting crank pin discs and two interacting crankshafts, caused by the fact that the two last mentioned yoke constructions at the middle of their sliding surfaces both have longitudinal and projecting guide rails implying that they only may use crosshead slides designed with longitudinal guide and clearance grooves like the one shown in FIGS. 9, 10, and 11.

The draft FIG. 14 shows how a crosshead yoke for the same applications, as the I-yoke (5) shown in FIG. 1, is built up from sliding surface beams like the one shown in FIG. 13. It appears to be a "beam yoke", in principle built up of two sliding surface beams, which, except for their length and the embodiment with only one crosswise groove in each of the sliding surface beams, is made with the use of the same components as the "beam yoke" in FIG. 13. Which is advantageous for reduction of costs of manufacturing and logistics in a firm making engine or compressor types with different performance. Besides, the yoke shown in FIG. 14 is especially rigid to bending and twisting which can make it usable in applications where very large operating pressures appear on the piston, e.g. in diesel engines.

The fastening of piston-rods to crosshead yokes can be made from of two different principles, namely either with the object of forming a basis of fastening holding the piston-rod as rigidly as possibly to extend perpendicularly from the crosshead, or made with the object of making a basis of fastening being sufficiently rigid to, unprovoked by forces, hold a piston-rod to remain extended perpendicularly from the crosshead yoke, but with the ability of, without transferring substantial lateral pressure to the piston-rod and its piston, being able to tolerate emergence of lesser distortions of the crosshead yoke during the operation of the machine without these movements being performed practically an infinite number of times resulting in fatigue fracture.

A simple way of fastening is to design a fitting (48,48' FIGS. 19 and 20) in one with the crosshead yoke (5) on its top flange or on both its top and bottom flanges, as the fitting is formed with a short cylindrical guide engaging the hollow of the cylindrical piston-rod and guiding the piston-rod to the proper position where both the piston-rod and its piston is fastened by a long screwbolt which is screwed into a thread formed in the centre of the fastening fitting. The way of fastening is unsuitable because of the weight of the relatively long bolt.

In connection with the invention, as the invention indicates the use of crosshead yoke with two crosshead slides working in mutual synchronized opposition ensuring that the yoke is always moved perpendicularly to the axis of the piston without provoking lateral pressure on piston-rods or pistons, there may be used piston fastenings being unthinkable and unusable for application in other force conversion mechanisms, namely fastening fittings with grooves crosswise of the longitudinal axis of the crosshead yoke and in which grooves a flat and rectangular fastening pin may be accommodated and fastened, the fastening pin projecting from the lower end of the piston-rod.

This way of performing fastening of piston-rods implies several advantages, the used components are of simple embodiment, their weight is low, they are easy to mount or to integrate, they do not result in any substantial increase of the overall height of the machines, they allow insertion and removal of piston-rods with fitted piston without disassembling and removing of interacting components and mechanisms, the fitting members fastened in the piston-rod do not protrude out from the piston-rod diameter, the necessary fastening fittings can imply suitable extra strength and rigidity being imparted to the yoke.

The fastening fitting shown in FIG. 12 is mentioned earlier in the text, it is a fitting with a crosswise groove for accommodating a fastening pin projecting from the piston-rod, the pin being either rigid or flexible. Crosswise groove (51), tight-fitting bolt through the groove (52), side plate in groove (53), and flat ended pointed screws for fastening.

The crosswise grooves (44,44') shown in FIGS. 13, 14, and 15 are all integrated, besides mentioned earlier.

The fastening fitting shown in FIGS. 16, 17, and FIG. H—H is shown with flat, rectangular and stiff fastening pin (54) projecting from the piston-rod (2), cylindrical basis of fastening in piston-rod (59), tight-fitting screw in groove (52), base of fastening fitting (50), thin side plate part for groove (57), thick side plate part for groove (58), screwbolts for screwing on (60), top flange on I-yoke (12), bottom flange on I-yoke (12'), central web part in I-yoke (17).

The draft FIG. 18 shows disposing a flat, rectangular, and flexible fastening pin (61) projecting from the piston-rod (2), cylindrical basis of fastening in piston-rod (59), hole for tight-fitting screw (55), furthermore the draft shows in principle the placing and shape of a piston-rod guide. The piston-rod guide serves for guiding the cylindrical piston-rod (2) which is provided with a so-called flexible fastening pin which by having its cylindrical basis of fastening (59) disposed rather far up in the hollow cylindrical piston-rod in combination with the machine using an extremely short, light piston, it can be desirable to ensure the exact reciprocation of the piston-rod in its piston axis, which may be effected by providing a piston-rod guide at the place of insertion of the piston-rod in the bottom of the cylinder.

The piston-rod guide (62,62') is placed in the bottom of the cylinder (4), it has a support ring (63) at its centre with a smooth and wear-resistant slide bushing (64), through which the piston-rod reciprocates. The support ring is fastened in the centre by being connected with an outer ring (66) fitted in the cylinder liner (4) by relatively few and narrow stay ribs, whereby there is formed openings (65) allowing oil drops and oil saturated air fog appearing under the piston (1,1') during operation to be sucked in and out of the space under the piston and hereby supply lubrication to the cylinder walls as well as conduct heat away to the pressure oil lubricated crank pin disc or crank chamber, which conducting away of heat may be further enhanced by filling a suitable amount of sodium into the inner of the piston-rod, the sodium melting to liquid during operation which is flung to and fro between the basis of fastening of the piston and the basis of fastening of the fastening pin.

Irrespectively whether, e.g. as shown in FIG. 26, there is achieved a mutual balancing countering unbalance transferred to absorption in the suspension of the engine/machines, the crank pin discs have to be furnished with bearings which for absorbing the considerable forces appearing in the mechanism as well as for minimizing the overall axial length has to be of such a large diameter that they can operate directly on the cylindrical peripheral surfaces of the crank pin or ball link discs, the surfaces thus acting as journals in the bearings.

The existing types of bearings appeared to be unsuitable, either because of missing carrying capacity, their limitations to operate at the required peripheral speeds, their too large volumes, or their costs of manufacturing, in connection with the invention there is developed a new hydrodynamic bearing being usable for suspending crank pin discs.

Figure 19:
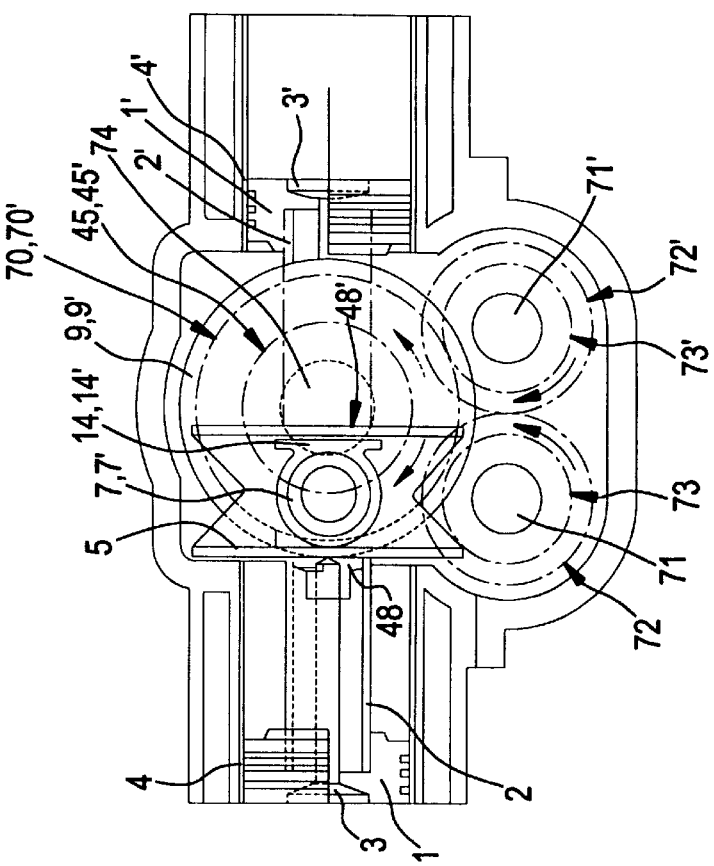

FIG. 19 illustrates how the I-yoke mechanism may be applied in a four-stroke in-line engine.

It appears from FIG. 19, that engines with I-yoke mechanisms may be build very compact, partly because the pistons of the engines may be made very short, as they are kept clear of lateral pressure, and partly because very short, hollow, cylindrical piston rods may be used. The drafted engine has an overall height from the crank pin centre to the top of the piston of about 70% of the corresponding overall height of engines with crank pin and connecting rod mechanisms.

Figure 20:
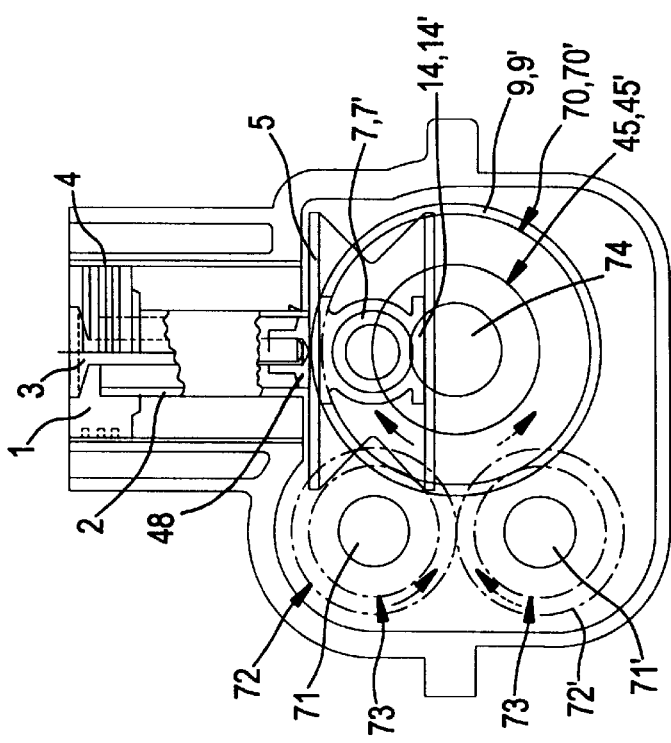

FIG. 20 illustrates that piston machines with I-yoke mechanisms to a still higher degree may be made compact and economical as compared with in-line engines, as two pistons placed in the same piston axis use a common I-yoke mechanism consisting of exactly the same number of components used for one piston in an in-line engine.

The draft FIG. 20 shows how synchronization and force absorption is performed in the engines shown in FIGS. 19 and 20 if these are build with two I-yoke mechanisms, as the same numbering of the constituent components in all three drafts is used for enhancing intelligibility.

Figure 22:
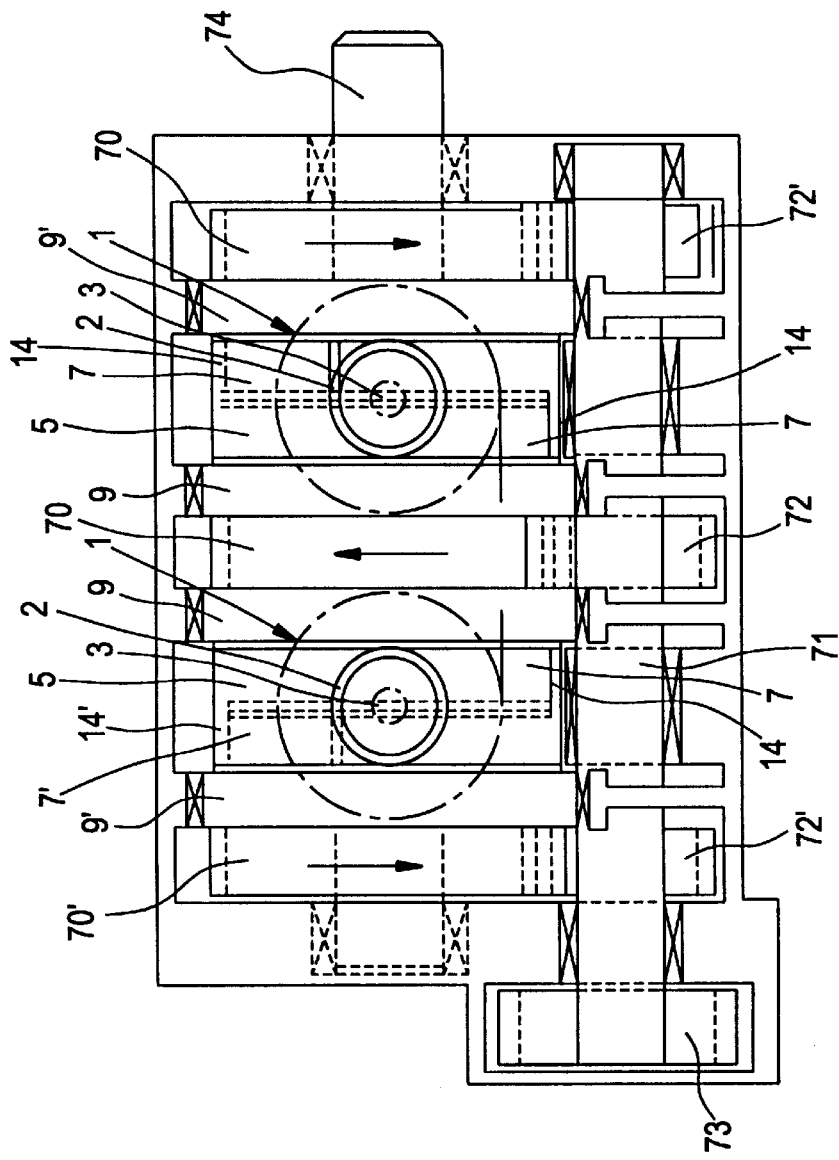

It appears from the drafts FIGS. 19, 20, and 22 that the short pistons are firmly mounted on hollow, cylindrical piston rods 2 in the case of thorough-going screwbolts 3 which at the same time clamp the piston rods firmly to their crosshead yoke 5 which in the case has been given fastenings protruding into the hollow piston rods which for conducting away of heat from the piston may be filled with sodium as with many heavily loaded exhaust valves.

At each side of the crosshead yokes 5 there are disposed crank pin discs 9 and 9' close to these and shaped like the crank pins 7 and 7' like those shown in FIG. 1 and which are provided with their respective crosshead slides 14 and 14' which from each their side engage both sides of the central web part of the crosshead yoke, as they with their sliding surfaces with slide fit abut on the projecting base and top flanges of the crosshead yoke.

It does not appear from the drafts FIGS. 19 and 20 how the crank pin discs 9 and 9' are suspended but from FIG. 22 it is seen that they are suspended at their outer periphery with the hydrodynamic bearings developed in connection with the invention.

In FIG. 22 it is illustrated that the bearings are placed in partition walls in the crank pin disc housing. From the draft, supported by the drafts FIGS. 19 and 20, it also appears how a combined power output and synchronizing mechanism can be embodied so that the crank pin discs simultaneously are used for retransmitting the driving force transmitted to them from the pistons, are guided to stay in their axial positions, and are synchronized to remain in their mutually correct peripheral positions during rotation.

It appears that intermediate crank pin discs 9 are rotated in the same direction. As shown, they may therefore be firmly connected with one gear wheel interposed between them and made of two helical gears joined together which thus together form an arrowhead toothed gear wheel brought into engagement with a smaller gear wheel 72 disposed on the shaft 71 which at one end carries a common helical gear wheel 73 engaging a likewise helical gear wheel 73' with the same pitch diameter mounted at the end a shaft 71' extending in parallel with the shaft 71 and carrying two commonly helical gear wheels 72' which engage the gear wheels 70 mounted firmly connected with their crank pin discs 9' which are suspended by their hydrodynamic bearings and axially and radially are further suspended on their projecting shafts.

It is evident that the engagement between the arrowhead shaped gear wheels 70 and 72 ensures the axial guiding of the crank pin discs 9 when the two shafts 71' and 71' are suspended axially as well as radially close to their equally large gear wheels 73 and 73'. It is evident too that the mechanism at the same time both synchronises the crank pin discs in their mutual opposite rotations and collect the drive forces transmitted to them from the pistons, the drive forces finally being transmitted to the gear wheel 70' mounted on the shaft 74 which is the power output of the engine.

Besides, the mechanism may also be designed so that power output is effected through one shaft 90 as shown in FIG. 23.

From FIG. 23 it appears that the output for the two middle, connected crank pin discs in the drafted machine is effected through a pair of gear wheels 91,91' with identical pitch diameter while the output from the two outermost situated crank pin discs is effected by a chain drive 92,92' of the "silent chain" type through sprocket wheels with the same pitch diameter.

It is of course possible to use chain drive in the middle and sprocket wheel drive outermost.

The drafted combined power output and synchronizing mechanisms may of course be applied to all kinds of machines performing by the use of oppositely rotating crank pin.

The short overall height and balancing function achieved by the use of the I-yoke mechanism makes this especially usable for boat and ship engines.

Figure 21:
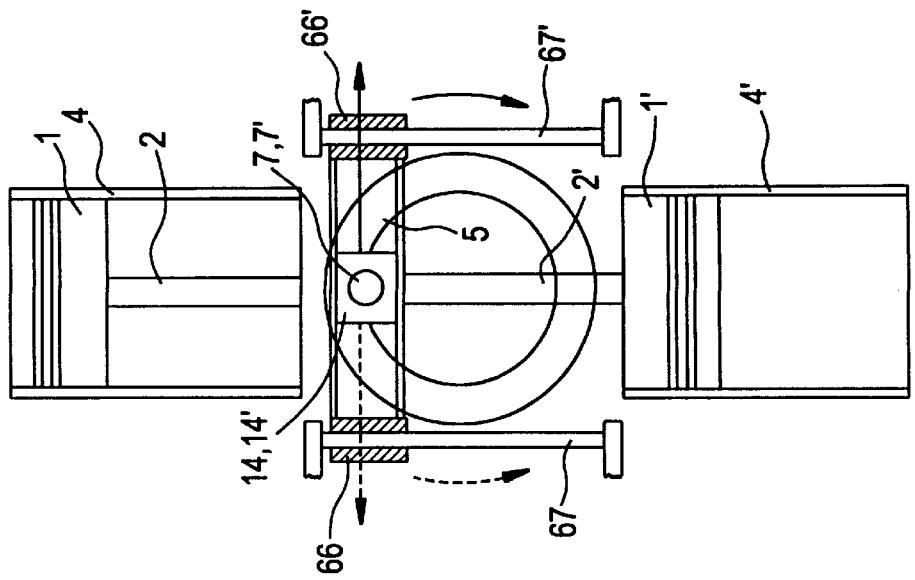

As the latter are working with relatively large and heavy pistons, it may be suitable to relieve the I-yoke mechanism with longitudinal guide as illustrated in FIG. 21. The guide may be shaped in different ways, possibly only at one end of the crosshead yoke.

What is claimed is:

1. A piston machine apparatus comprising at least one axially movable piston in a cylinder, a hollow cylindrical piston-rod, a rotating power input or power output shaft, the cylindrical piston-rod connecting the piston to the rotating power input or power output shaft, a crosshead yoke coupled to the piston-rod and disposed perpendicularly to an axis of the piston-rod, the yoke having crank pin journals, sliding surfaces, two crank pin discs and double cranks coupled for interacting via the yoke, two crosshead slides disposed on each crank pin journal and fitted in between the sliding surfaces of the yoke, the two crosshead slides having a synchronized mutually opposed sliding movement along the yoke when the two crank pin discs or the double cranks interacting via the yoke rotate with identical rpm in mutually opposite directions of rotation, the rotation being adjustable such that the two crosshead slides are positioned on the yoke simultaneously with the piston being in a top or a bottom dead point, the yoke comprising top and bottom flanges having longitudinal sliding surfaces along mutually facing side surfaces, the side surfaces being adapted for fastening of the longitudinal sliding surfaces thereon, the yoke having a web portion, the two crosshead slides being disposed on each side of the web portion and having mutually opposing sliding movements along the yoke when the crosshead slides pass each other along a middle of the yoke to perform outward strokes, the opposing sliding movements for both slides ending simultaneously by reversal of a direction of the sliding movement equidistantly from the middle of the yoke, and a piston portion proximal the piston-rod being fastened on an outward facing side surface of at least one of the top and bottom flanges of the yoke for arranging the piston directly over the power input or power output shaft.

2. The apparatus of claim 1, wherein the yoke is coupled interactively with the two crank pin discs, the crank pin discs being rotatable at both sides of the yoke about individual axes of each of the crank pin discs, the individual axes being disposed in a plane perpendicular to an axis of the cylinder.

3. The apparatus of claim 2, wherein the individual axes are offset laterally equidistantly to the axis of the cylinder when extending perpendicularly toward the yoke.

4. The apparatus of claim 3, wherein the yoke comprises a generally I-shaped cross section having a central web part with projections forming the top and bottom flanges.

5. The apparatus of claim 4, further comprising two identical T-shaped section members forming the yoke, the section members extending along a full length of the yoke and being mutually joined by a web part of the first section being laid against a web part of the second section with a top flange of the first section facing upward and a top flange of the second section facing downward, respectively, the web parts of the two sections comprising a longitudinal engaging groove and an engaging projection interacting with the engaging groove, the web parts being clamped together with tight-fitting bolts thus jointly forming the central web part and the I-shaped cross section in the yoke, the central web part being symmetrical about a longitudinal central vertical plane, the top flanges of the first and second sections comprising a respective projection on one side of the respective web parts, the projections having a thickness longer than a thickness of an opposite side of the web part for forming the sliding surfaces or fastening of the sliding surfaces, the sliding surfaces having identical widths on each side of the central web part of the yoke.

6. The apparatus of claim 5, wherein each of the crosshead slides moving in opposite directions in the yoke comprise two identical slide halves forming bushing halves, wherein the bushing halves are disposed around the crank pin journals having a countersunk, screwbolts or conical ring discs for clamping the bushing halves together at each end by squeezing together and by pressing inward over the countersunk, outward facing tapered cones formed in the slide halves, and a countersunk screwed in a pitch surface between the slide halves.

7. The apparatus of claim 6, wherein the crosshead slides moving in opposition in the yoke further comprises at least one slide rail along each sliding surface and guide pins on the slide halves, the at least one slide rail being firmly fixed in position on the crosshead slide halves of the guide pins.

8. The apparatus of claim 7, wherein the at least one slide rail comprises two slide rails along each sliding surface having thicknesses forming a longitudinal guide, a clearance groove formed by the crosshead slides in the yoke comprising the two T-shaped sections for accommodating portions of the web part of the T-shaped sections after cutting out.

9. The apparatus of claim 5, wherein the yoke on an outward facing side of the top and bottom flanges comprises reinforcing ribs for counteracting deformation of a cross-section of the yoke and preventing bending and twisting along a longitudinal, straight extension of the yoke, fastening fittings or longitudinal, reinforcing stay bolts insertable in the ribs, the ribs being shaped for reinforcement, holes in the ribs, distant end-plates and distant intermediate plates on the yoke, tight-fitting bolts or tight-fitting screws for fastening the distance end plates and distance intermediate plates on the top and bottom flanges and the sliding surface beams at a correct mutual distance and for counteracting deformations longitudinally and crosswise of the crosshead yoke.

10. The apparatus of claim 4, further comprising two crankshafts disposed side-by-side and rotatable in mutually opposing directions about respective crankshaft axes, the crankshaft axes being in a plane perpendicular to the axis of the cylinder, wherein the yoke interacts with the two crankshafts disposed at a sufficient distance from each other and each disposed at a same distance from the middle of the yoke when directed perpendicularly against the yoke.

11. The apparatus of claim 10, further comprising sliding surface beams on the yoke, elongated cut-outs in ends of the central web part of the I-shaped yoke and longitudinal apertures in the yoke, wherein the crank pin journals are passed through the elongated cut-outs or through the longitudinal apertures in the yoke with the sliding surface beams, and further comprising crosshead slide bushings formed by two halves of the crosshead slides, wherein each crank pin journal comprises two halves and is suspended in a respective individual crosshead slide bushing formed by the two halves of an interacting crosshead slide, and wherein rotation movements of the crank pin journals enable the crosshead slides to slide along the sliding surfaces of the crosshead yoke in exact mutual opposition movements.

12. The apparatus of claim 11, wherein the yoke comprises a fastening receiver on at least one of the top and bottom flanges or on the sliding surface beams for fastening the piston-rod, the piston-rod being disposed on sides of the yoke along a singular piston axis, wherein the piston rod and the piston operate perpendicularly to a longitudinal axis of the yoke.

13. The apparatus of claim 12, further comprising a piston bolt for rigidly fastening the piston-rod on the yoke, the piston bolt disposed centrally in a top of the piston and passed down through the piston-rod for coupling with the fastening receiver in the yoke and the piston bolt being shaped for engaging the piston-rod and precisely fixing the piston-rod in a correct position on the yoke.

14. The apparatus of claim 13, further comprising a fastening fitting having a foot plate part and locking projections for rigidly fastening the piston-rod on the yoke, a groove formed between reinforcing ribs on the top and bottom flanges of the yoke, the locking projections interfitting from ends of the yoke into the groove, locking grooves on the fastening fitting and fasteners having pointed screws with flat ends for engaging the locking projections in the foot plate part of the fastening fitting above the middle of the yoke, a crosswise groove with side plates on the fastening fitting for correctly positioning the fastening fitting on the yoke, a rigid, rectangular fastening pin extending from a bottom of the piston-rod being insertable through the crosswise groove, holes in the side plates of the groove and a complementary hole in the fastening pin, and a tight-fitting bolt for fitting within the holes in the side plates and the complementary hole in the fastening pin for fastening the piston-rod rigidly to the yoke.

15. The apparatus of claim 13, further comprising a fastening fitting with a crosswise groove for fastening the piston-rod rigidly to the yoke, a rectangular and rigid fastening pin extending from a cylindrical fastening base soldered on an end of the piston-rod, the fastening pin being adapted for insertion into the crosswise groove, a fit-hole in a thinner side plate part of the fitting and a complementary fit-hole in the fastening pin, threads on a thicker side plate part of the fitting, a tight-fitting screw having a threaded peg fitted into the fit-hole of the side plate part and the complementary fit-hole of the fastening pin for fitting the piston-rod on the yoke, and the threaded peg of the tight-fitting screw being coupled to the threads on the thicker side plate part of the fitting.

16. The apparatus of claim 13, further comprising crosswise grooves on the piston-rod or crosswise grooves on a fastening fitting for rigidly fastening the piston-rod on the yoke, a rectangular and an elongated fastening pin extending from a cylindrical fastening base deeply inside the piston-rod, the elongated fastening pin forming a stiff spring element insertable in the grooves for fastening the piston-rod perpendicularly to the yoke, wherein the spring element is deeply embedded in the piston-rod and has properties for compensating against forces acting on the piston-rod rigidly fastened on the yoke and the piston, wherein the forces are caused by a large play in synchronizing mechanisms determined by tolerance and wear, and wherein the properties include flexibility for allowing the yoke to minimally bend along a longitudinal axis from a position exactly perpendicular to the axis of the piston-rod.

17. The apparatus of claim 1, further comprising a piston-rod guide for supporting the hollow cylindrical piston-rod on insertion in a bottom of the cylinder, the piston-rod guide having a support ring with a smooth, wear-resistant slide bushing and an outer ring fitted in a cylinder liner, narrow stay ribs extending radially from the support ring connecting the support ring with the outer ring, apertures formed by the stay ribs connecting the support ring and the outer ring, oil drops and oil saturated air fog provided in spaces under the piston, the apertures allowing the oil drops and the oil saturated fog to be sucked in and out of the space under the piston during operation for partly supplying lubrication to walls of the cylinder and for conducting heat away to a pressure oil lubricated crank pin disc or crank chamber, a closed hollow inner end of the piston-rod end comprising a filling of sodium for enhancing the conducting away of heat, and the sodium melting to form a liquid during operation wherein the sodium is flung back and forth between a base of fastening of the piston and a bottom base of fastening of the piston-rod.

18. The apparatus of claim 1, further comprising bushing guides on two ends of the crosshead yoke, complementary guides at each end on a support of a piston machine for receiving the bushing guides and for counteracting longitudinal and crosswise displacement and twisting of the yoke and relieving the piston and the piston-rod from lateral pressure.

\* \* \* \* \*